United States Patent [19]

Inoue

[11] Patent Number: 4,578,555
[45] Date of Patent: Mar. 25, 1986

[54] FAIL-SAFE MACHINE TOOL OPERATIONAL SETTING SYSTEM WITH PRERECORDED VERBAL INSTRUCTIONS

[75] Inventor: Kiyoshi Inoue, Tokyo, Japan

[73] Assignee: Inoue-Japax Research Inc., Kanagawaken, Japan

[21] Appl. No.: 438,286

[22] Filed: Nov. 1, 1982

[30] Foreign Application Priority Data

Oct. 30, 1981 [JP] Japan .................... 56-172833

[51] Int. Cl.⁴ .................. B23P 1/08; G05B 9/02; G06F 3/16; G08B 21/00
[52] U.S. Cl. ...................... 219/695; 318/563; 340/309.4; 340/500; 340/680; 364/185; 364/474
[58] Field of Search ................ 219/69 S, 69 M, 69 C, 219/69 R, 10.55 B, 506; 340/27 R, 286 R, 309.4, 384 E, 500, 692, 679, 680; 360/12; 381/53-57; 364/171, 184, 185, 188, 189, 474; 318/563, 568

[56] References Cited

U.S. PATENT DOCUMENTS

| | | | |
|---|---|---|---|
| 3,641,496 | 2/1972 | Slavin et al. | 381/51 |
| 3,673,371 | 6/1972 | Smith et al. | 219/69 S |
| 3,757,095 | 9/1973 | Kiwiet | 364/171 |
| 3,825,713 | 7/1974 | Bell, Jr. | 219/695 |
| 4,010,356 | 3/1977 | Evans et al. | 364/171 |
| 4,016,540 | 4/1977 | Hyatt | 364/900 |
| 4,042,866 | 8/1977 | Morita et al. | 318/568 |
| 4,060,848 | 11/1977 | Hyatt | 381/51 |
| 4,071,729 | 1/1978 | Bell, Jr. | 219/69 C |
| 4,090,240 | 5/1978 | Blanchard | 318/568 |
| 4,107,464 | 8/1978 | Lynch et al. | 340/692 |
| 4,135,239 | 1/1979 | Hamill, III et al. | 364/193 |
| 4,229,804 | 10/1980 | Kobayashi et al. | 364/474 |
| 4,266,096 | 5/1981 | Inoue et al. | 381/53 |
| 4,288,789 | 9/1981 | Molinizk et al. | 340/500 |
| 4,325,081 | 4/1982 | Abe et al. | 340/309.4 |
| 4,339,749 | 7/1982 | Yamada | 340/679 |
| 4,340,797 | 7/1982 | Takano et al. | 219/10.55 B |
| 4,344,127 | 8/1982 | McDaniel et al. | 318/569 |
| 4,349,715 | 9/1982 | Mariyama | 219/10.55 B |
| 4,351,999 | 9/1982 | Nagamoto et al. | 219/10.55 B |
| 4,361,745 | 11/1982 | Rupert et al. | 219/69 C |
| 4,381,505 | 4/1983 | Dion | 340/286 R |
| 4,428,055 | 1/1984 | Kelley et al. | 318/572 |
| 4,455,551 | 6/1984 | Lemelson | 340/692 |
| 4,481,507 | 11/1984 | Takiguchi et al. | 340/692 |

FOREIGN PATENT DOCUMENTS

| | | | |
|---|---|---|---|
| 149984 | 11/1979 | Japan | 340/680 |
| 1356075 | 6/1974 | United Kingdom . | |
| 2022872 | 12/1979 | United Kingdom | 318/568 |
| 2050979 | 1/1981 | United Kingdom . | |

OTHER PUBLICATIONS

"Fire Guardian" by Electrotools in Dec., 1980 publication.

*Primary Examiner*—C. L. Albritton
*Assistant Examiner*—Geoffrey S. Evans
*Attorney, Agent, or Firm*—Karl F. Ross; Herbert Dubno

[57] ABSTRACT

A safety system for a machine tool, e.g. an EDM machine, having a multiplicity of different items of setting procedure to be attended to manually and inspected by the operator before the machine is actuated for performing a given machining operation, employs a loudspeaker associated with the machine. A control unit is used to produce a preselected sequence of multiple, time-spaced electrical signals corresponding to multiple verbal instructions prescribed for alerting the different setting items, respectively, and to apply these signals in that sequence to an electromechanical transducer in the loudspeaker. The transducer responsive to each of the electrical signals produces through the loudspeaker a corresponding unit of the multiple verbal instructions audible to the operator for a corresponding item of the setting procedure. A manual switch is provided so as to be actuated by the operator upon his checking of the item to produce an OK signal therefor, which is applied to the control unit to allow a next of the electrical signals in the prescribed sequence to be issued, thereby permitting the loudspeaker to emit a next corresponding unit of the multiple verbal instructions audible to the operator for a next corresponding item of the setting procedure.

4 Claims, 2 Drawing Figures

FAIL-SAFE MACHINE TOOL OPERATIONAL SETTING SYSTEM WITH PRERECORDED VERBAL INSTRUCTIONS

FIELD OF THE INVENTION

The present invention relates to a safety system for a machine tool, e.g. an EDM (electrical discharge machining) machine tool, having a multiplicity of different setting procedures to be precisely attended to manually and inspected by an operator before the machine tool is brought into actuation for performing a given machining operation.

BACKGROUND OF THE INVENTION

Certain machine tools such as an EDM machine require a number of complicated preparatory setting procedures to be conducted by the operator before the machine is actuated. If these setting procedures fail to have been attended to properly, the machine does not operate properly, malfunctions or even causes a danger of, for example, a fire. It is essential, therefore, that the settings be individually inspected carefully. This has heretofore imposed requirements for a high degree of experience and skill on the operator.

OBJECTS OF THE INVENTION

The present invention seeks to provide a safety system for a machine tool of the type described to enable the machine to be operated readily but properly and without fail by an inexperienced operator. The present invention also seeks to provide a safety system for an EDM machine such that protection against or from a possible fire is effectively ensured.

SUMMARY OF THE INVENTION

In accordance with the present invention there is provided a safety system for a machine tool having a multiplicity of different items of setting procedure to be attended to manually and inspected by an operator before the machine tool is brought into actuation for performing a given machining operation, which system comprises: a loudspeaker associated with the machine tool for emitting verbal signals audible to the operator; control means for producing a preselected sequence of multiple, time-spaced electrical signals corresponding to multiple verbal instructions prescribed for alerting the operator to the different setting items of procedures, respectively; electromechanical transducer means associated with the loudspeaker responsive to each of the electrical signals from the control means for producing through the loudspeaker a corresponding unit of the said multiple verbal instructions audible to the operator for a corresponding item of the setting procedure; manual switch means actuatable by the operator upon his checking of that item to produce a verification signal therefor; and circuit means for supplying to the control means the verification signal to allow the control means to issue the next electrical signal in the prescribed sequence, thereby permitting the loudspeaker to emit a next corresponding unit of the multiple verbal instructions audible to the operator for a next corresponding item of the setting procedure.

BRIEF DESCRIPTION OF THE DRAWING

These and other features of the present invention as well as advantages thereof will become more readily apparent from the following description of certain embodiments thereof when read with reference to the accompanying drawing in which.

SPECIFIC DESCRIPTION

Figure 1:
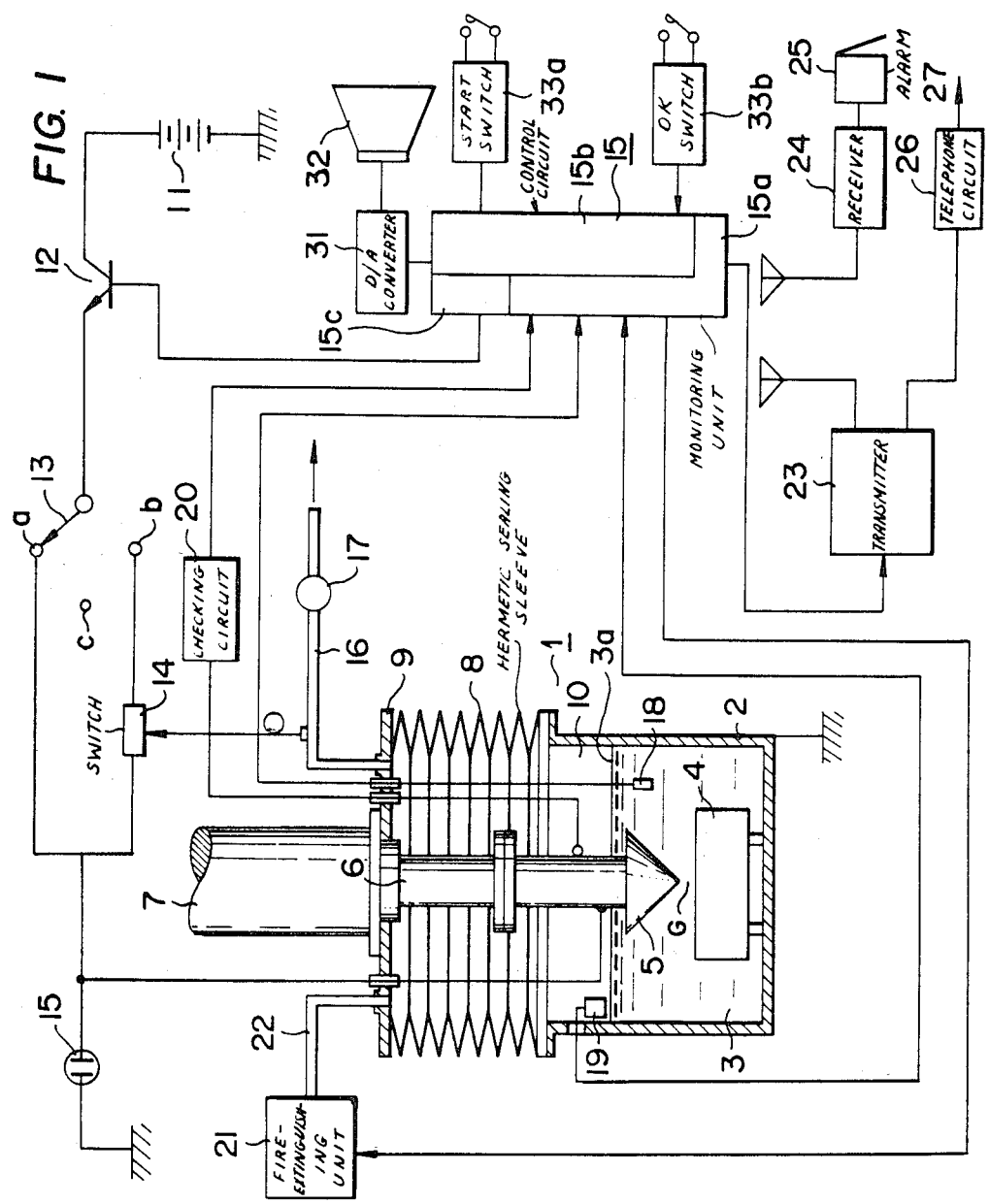
FIG. 1 is a schematic view, partly in section and partly in a circuit-diagram form, illustrating an EDM arrangement incorporating an embodiment of the present invention.

In FIG. 1 there is shown an EDM arrangement incorporating the present invention. An EDM machine tool 1 includes a worktank 2 containing a dielectric fluid 3 such as kerosene which is inflammable. Within the worktank 2 a workpiece 4 is immersed in the dielectric fluid 3 and secured in position in spaced juxtaposition with a tool electrode 5. The tool electrode 5 is coaxially carried by a spindle 6 which is in turn carried by a ram head 7. The spindle 6 is surrounded by a bellows-type sleeve 8 which has its lower end secured to the top of the worktank 2 and its upper end secured to a centrally apertured plate 9 attached to the lower end of the ram head 7 so as to accept the upper end of the spindle 6. The bellows-type sleeve 8 is used to cover the worktank 2 and, specifically, hermetically sealed from the environment a space 10 is defined above the surface 3a of the dielectric fluid in the worktank 2.

The tool electrode 5 is electrically connected to one terminal of a DC power supply 11 whose other terminal is grounded. Included in the circuit between the DC supply 11 and the tool electrode 5 are a power switch 12, shown by a transistor, and a two-position change-over switch 13 having a first contact a directly connected to the tool electrode 5 and a second contact b directly connected to the tool electrode 5 via a further switch 14 which will be described. The workpiece 4 is grounded via the worktank 2 which is electrically conductive. A discharge tube 15 is connected in parallel with the tool electrode 5 and the workpiece 4.

The power switch 12 is periodically turned on and off by a pulsing circuit included in a control unit 15. Thus, with the switch 13 set at either the position a or b, a succession of EDM pulses are passed between the tool electrode 5 and the workpiece 4 to electroerosively remove material from the workpiece 4. As material removal proceeds, the tool electrode 5 is advanced towards and into the workpiece 4 so as to maintain the EDM gap spacing G therebetween by a servomechanism (not shown) drivingly coupled with the ram head 7. As material removal continues, gases produced by decomposition of the dielectric fluid 3 with successive electrical discharges are evolved from the machining gap G tending to fill the space 10 above the liquid surface 3a. These gases are drawn via a conduit 16 by a suction pump 17 from the space 10 into a suitable site remote from the worktank 2 or the machine tool 1. The switch 14 is constituted by a pressure switch responsive to a drop of the gaseous pressure in the space 10. When the gaseous pressure in the space 10 drops below a given level, the switch 14 is turned off, thereby electrically disconnecting the tool electrode 5 from the machining power supply 11 when connected therewith. The change-over switch 13 is set at the position b when it is desired to allow the machine tool 1 to remain operating unattended by the operator.

Within the worktank 2 there is immersed a float switch 18 in the dielectric fluid 3 to detect the surface thereof falling below a predetermined level which approaches the site of electrical discharges so that the dielectric may be ignited in the presence of oxygen in the space 10, thus causing a fire in the worktank 2. A signal detected by the float switch 18 is fed to the control unit 15. A fire detector 19 is disposed in the space 10 above the surface 3a of the dielectric liquid to detect a fire which may occur in the worktank 2. A signal detected by the detector 19 is again fed to the control unit 15. Furthermore, the machine tool 1 is provided with an arc checking circuit 20 designed to detect a continuous arc that may occur in the machining gap and to produce an arcing signal which is fed to the control unit 15.

The control unit 15 comprises a first portion 15a and a second portion 15b. The first portion 15a of the control unit 15 includes a monitoring circuit designed to judge which of prescribed measures is to be taken in response to signals which may be incoming from the arc checking circuit 20, the float switch 18 and/or the fire detector 19. When a fire is judged to have occurred, the control unit 15 actuates a fire extinguishing unit 21 communicating via a duct 22 with the space 10 to extinguish the fire on the latter. The control circuit 15 may then feed the fire-occurrence signal to a transmitter 23 to cause it to transmit a radio-frequency signal which can be received by a receiver 24 disposed at a suitable site, e.g. an office, which is remote from the plant in which the machine tool 1 is located. The receiver 24 is used to actuate an alarm 25 which produces an audible and/or visible alarm signal. The transmitter 23 may also be connected with a telephone circuit 26 to transmit the fire signal thereover to a fire station 27. A third portion 15c of the control unit 15 includes a pulsing circuit which as previously mentioned, operates to periodically energize the power switch 12. The fire or arcing signal from the control unit 15 (15a) is used to change the position of the change-over switch 13 to position C, thus disconnecting the tool electrode 5 and hence the workpiece 4 as well from the machining power supply 11.

In order for all these corrective measures to be performed without fail and satisfactorily, it is essential that the float switch 18, the fire detector 19 and the arc checking unit 20 be set manually by the operator without fail and properly. There are many other setting procedures to be conducted with EDM machines. For example, the pulse parameters, e.g. peak current, on-time and off-time of pulses and threshold value for servocontrol must be set. Thus, in accordance with the principles of the present invention, the second portion 15b of the control circuit is designed to issue a given sequence of electrical signals which are applied via an amplifier or digital-analog converter 31 to a loudspeaker 32 including an electromechanical transducer to convert them into verbal signals audible to the operator, these verbal signals being prescribed for alerting predetermined different setting procedures, respectively, to be conducted and inspected by the operator.

The control portion 15b is actuated when a start switch 33a is depressed by the operator to commence issuing the electrical signals. Another switch 33b is provided which can be depressed by the operator to respond to each of the verbal instructions emitted by the loudspeaker 32. Each of the verbal signals or instructions to be emitted by the loudspeaker 32 may be in the form of an inquiry. Thus, the first inquiry may be: "Have you set the float switch?" The operator is then required to check the float switch 18 which may have been set and, if he find this has not yet been done, to effect the setting. When he finds that it is all right, he depresses the OK switch 33b. The control portion 15b is designed to allow the next inquiry to be emitted through the loudspeaker 32 only upon the depression of the OK switch 33b. The inquiry this time may be: "Is your setting of the float-switch complete?" to give the operator an opportunity to recheck the float-switch 18. The switch 33b can be depressed to allow the next inquiry to issue which may be: "Have you set the fire extinguisher?" The operator is then required to check if the fire extinguisher 21 has been set and, if he finds it has, to depress the OK switch 33b. In this manner, further inquires are successively issued by the control portion 15b through the loudspeaker 32 and may be: "Is your setting of the fire extinguisher complete?", "Is your setting of the arc-checking circuit complete?", "Have you set the arc-checking circuit?", "Have you set the machining pulses?", "Is your setting of the machining pulses complete?" and so on. Subsequent to the issuance of each inquiry, the next inquiry is allowed to issue only upon depression of the OK switch 33b by the operator after checking in response to each previous inquiry.

Figure 2:
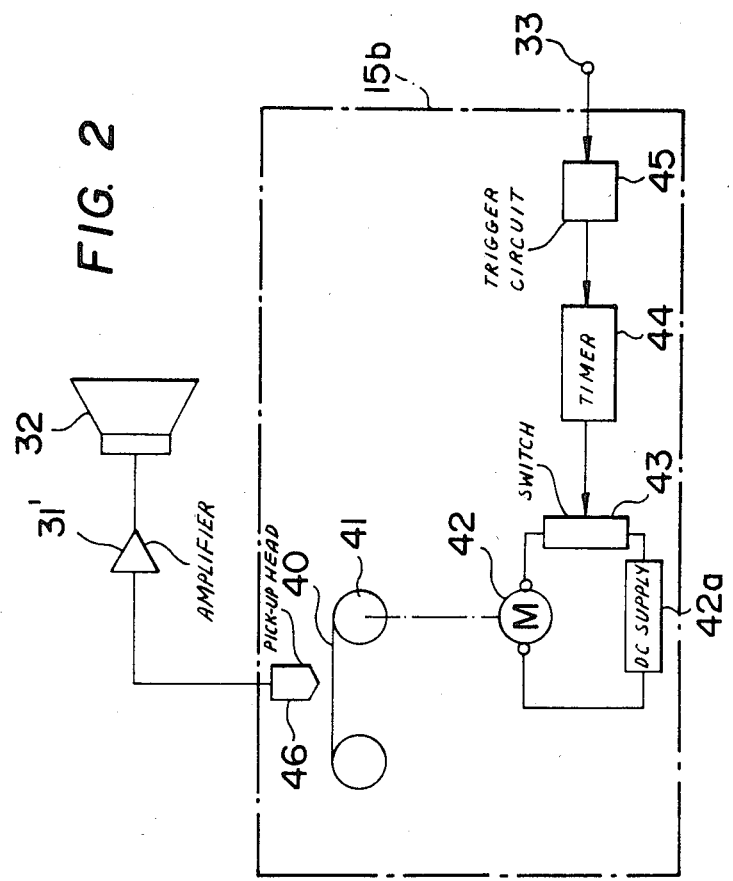
FIG. 2 is a circuit diagram illustrating an embodiment of a portion of the arrangement of FIG. 1.

In FIG. 2 there is shown an embodiment of the control portion 15b designed to emit through the loudspeaker 32 a prescribed sequence of verbal instructions for alerting the operator of a number of setting procedures to be conducted and inspected prior to operation of the machine tool 1. The embodiment shown makes use of a magnetic tape 40 on which the successive verbal instructions are previously recorded. The magnetic tape 40 is carried on a pair of rollers one of which, designated 41, is driven by a motor 42. The motor 42 is energized by a DC supply 42a and has a switch 43 connected in series therewith. The switch 43 is adapted to be turned on by a timer 44 for a predetermined time period to allow the motor 42 to rotate through a given angle. The timer 44 is actuated via a trigger circuit 45 by a manual switch 33 which here is designed to serve as both switches 33a and 33b in FIG. 1. When the switch 33 is manually depressed by the operator, the motor 42 is driven through a predetermined angle to displace the magnetic tape 40 by a correspondingly set distance in which each unit of the verbal instructions is recorded. A pick-up head 46 is juxtaposed with the magnetic tape 40 being displaced to produce an electrical signal which is applied via the amplifier 31 to the loudspeaker 32 where it is converted and reproduced into that unit of the verbal instructions which is audible to the operator.

What is claimed is:

1. A machine tool operable automatically to machine a workpiece, comprising:

(a) a plurality of complementary functional machine components which the operator prior to initiation of a given machining operation is required to set into their respective prescribed operating positions through at least a like plurality of different, predetermined manual setting procedures, to enable said machine tool to establish a predetermined operating mode and to properly operate in said mode automatically for machining the workpiece during said given machining operation; and (b) a fail-safe mechanism for aiding the operator in finishing said different, predetermined manual setting procedures properly and without fail, the mechanism (b) comprising:

(b') an audio system associated with said machine tool and including a loudspeaker for emitting in a preselected sequence different, prescribed verbal signals corresponding at least one by one to said different, predetermined manual setting procedures and audible to the operator, thereby alerting the operator to said different, predetermined manual setting procedures one by one in said sequence;

(c) manual switch means actuatable by the operator upon his listening to one of said verbal signals and thereafter upon his checking and verification of a corresponding one of said setting procedures as done in said prescribed sequence to produce a verification signal therefor; and (d) circuit means for supplying into said audio system said verification signal to allow said loudspeaker to emit a next one of said verbal signals in said preselected sequence and thereby to permit the operator to be alerted as to a corresponding next one of said setting procedures in said preselected sequence.

2. A machine tool as defined in claim 1 wherein said audio system comprises magnetic recording means for pre-recording said verbal signals in said preselected sequence.

3. A safety system for an electric discharge machining tool having a multiplicity of different items of setting procedure to be attended to manually and inspected by an operator before the machine tool is brought into actuation for performing a given machining operation, the system comprising the combination with said machine tool of:

a loudspeaker associated with said machine tool for emitting verbal signals audible to the operator;

control means for producing a preselected sequence of multiple, time-spaced electrical signals corresponding to multiple verbal instructions prescribed for alerting said different setting items, respectively;

electromechanical transducer means associated with said loudspeaker and responsive to each of said electrical signals from said control means for producing through said loudspeaker a corresponding unit of said multiple verbal instructions audible to the operator for a corresponding item of said setting procedure;

manual switch means actuatable by the operator upon his checking of said item to produce a verification signal therefor;

circuit means for supplying into said control means said verification signal to allow said control means to issue a next of said electrical signals in said preselected sequence, thereby permitting said loudspeaker to emit a next corresponding unit of said multiple verbal instructions audible to the operator for a next corresponding item of said setting procedure, a float-switch adapted to detect the surface of a dielectric fluid in said machine tool, a fire detector adapted to be juxtaposed with an electrode of said machine tool and an arc-checking circuit for detecting a continuous arc that may occur in a machining gap between said electrode and a workpiece, said units of said multiple verbal instructions constituting respectively instructions requiring the setting of the float switch, the setting of the fire detector and the setting of the arc-checking circuit.

4. A safety system as defined in claim 3, further comprising means for transmitting a signal indicating the occurrence of a fire in the machine tool to a remote location, and means for receiving said signal at said location.

* * * * *